(No Model.)

G. D. BURTON & E. E. ANGELL.
ELECTRIC METAL HEATER.

No. 475,192. Patented May 17, 1892.

WITNESSES.
INVENTORS

UNITED STATES PATENT OFFICE.

GEORGE D. BURTON, OF BOSTON, AND EDWIN E. ANGELL, OF SOMERVILLE, MASSACHUSETTS, ASSIGNORS TO THE ELECTRICAL FORGING COMPANY, OF MAINE.

ELECTRIC METAL-HEATER.

SPECIFICATION forming part of Letters Patent No. 475,192, dated May 17, 1892.

Application filed August 3, 1891. Serial No. 401,516. (No model.)

*To all whom it may concern:*

Be it known that we, GEORGE DEXTER BURTON, residing at Boston, in the county of Suffolk, and EDWIN ELLIOTT ANGELL, residing at Somerville, in the county of Middlesex, State of Massachusetts, citizens of the United States of America, have invented certain new and useful Improvements in Electric Heaters, of which the following is a specification.

This invention relates to electric heaters for heating metal to be forged or tempered.

The object of this invention is to provide means for the convenient performance of a number of different heating operations from the same electric converter.

Figure 1:
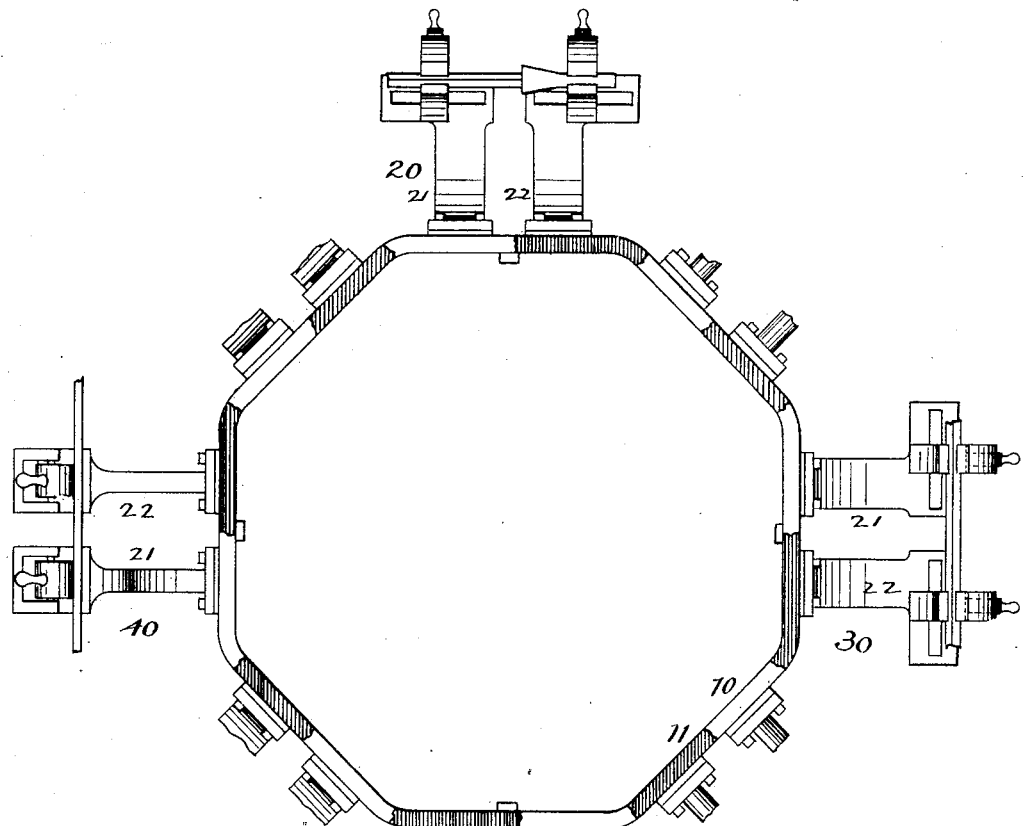
Figure 2:
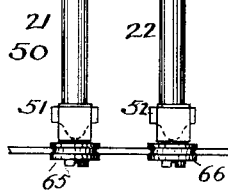
Figure 2:
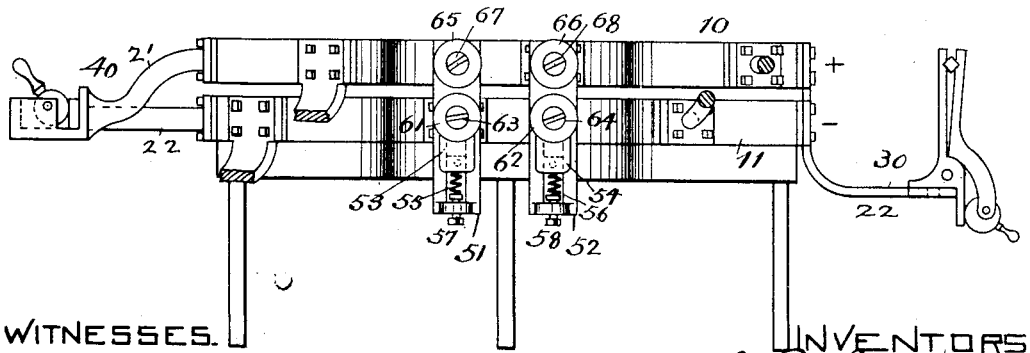

Figure 1 of the accompanying drawings represents a plan of this improved heating apparatus, the body of the electric converter being omitted and portions of the upper converter-ring being broken out. Fig. 2 represents a side elevation of this improved electric heater.

Similar numerals of reference indicate corresponding parts in both figures.

This apparatus includes an electric converter for converting an electric current of high voltage and small volume to a current of large volume and low voltage. The construction of the converter does not form a part of this invention and therefore need not necessarily be herein illustrated or described.

The construction of this converter may be similar to that described in the application, Serial No. 405,751, of George D. Burton, Arthur H. Eddy, and George T. Briggs, filed September 15, 1891.

The converter which has been used in this apparatus consists of an annular core composed of different lengths of uninsulated or partially-insulated wire, said lengths being arranged side by side and breaking joints at various intervals in the core; primary circuit-coils composed of comparatively fine wire and surrounding the said core at intervals; secondary coils composed of sheets or plates of copper surrounding said core between the primary coils and insulated therefrom; two exterior copper-rings disposed around the structure, the positive terminals of all the secondary coils being connected to one of said rings and the negative terminals of said secondary coils being all connected to the other of said rings; said rings thus constituting the positive and negative terminals of the converter as hereinafter described. The primary coils are arranged in pairs, the coils of each pair being in series with each other and in parallel with every other pair. The secondary coils are connected to the rings in parallel or multiple arc.

The rings 10 and 11, which are composed of copper or other suitable highly-conductive material, constitute the positive and negative rings of the current-converter, from which the currents are distributed to the heating devices or forges. These rings are preferably constructed in octagonal or other angular form, and the heaters proper are connected to the several straight sides thus formed.

A forge 20, especially adapted for heating the ends of a bar of metal, is disposed on one of the straight sides of the rings; a forge 30, for heating a bar longitudinally, is disposed on another straight side thereof; a forge 40, also for heating a bar longitudinally, is disposed on the opposite straight side of the converter; and a forge 50, for heating a moving rod, bar, or wire, is disposed on another straight side of the converter. These heaters may be used for any heating operation to which they may be applied. Other forges or heaters may be connected to the other straight sides of the converter, as indicated by the fragmentary brackets shown in the drawings.

The forges or heaters 20, 30, and 40 comprise conductors or brackets 21 and 22, composed of copper or other suitable conductive material, attached, respectively, to the upper and lower converter-rings 10 and 11, these brackets being provided with horizontal arms disposed in the same plane, and conductive supports or clamps for the bar or blank to be heated disposed on said arms. The horizontal arms may be slotted and the clamps adjustable thereon, as shown in the accompanying drawings and specifically described and claimed in other applications heretofore filed by us.

In the forge 50 the brackets 21 and 22 are provided with vertical standards 51 and 52.

These standards are provided with vertical slots or guideways, in which adjustable blocks 53 and 54 are disposed. Springs 55 and 56 are disposed in the slots below the sliding blocks, and set-screws 57 and 58 in the brackets serve to regulate the tension of said springs. Rolls 61 and 62 are supported on stub-shafts 63 and 64 on the blocks 53 and 54, and rolls 65 and 66 are disposed on stub shafts 67 and 68, attached to the vertical standards 51 and 52 above the slots therein. These rolls are thus disposed in pairs, one roll of each pair being fixed and the other automatically adjustable to conform to the size of wire or bar passed between them.

The rolls may all be composed of copper or carbon; but one roll of each pair is preferably composed of carbon or provided with a carbon face and the other roll of each pair composed of copper or provided with a copper face, and the pairs are preferably so disposed in relation to each other that the lower roll of one pair is the carbon roll and the lower roll of the other pair the copper roll. The rolls are provided with rounded or angular grooves for heating round or angular bars or wires.

In the use of this apparatus a number of men may work at the same time and a number of heating operations may be performed at the same time and in different manners by the same converter.

In the forge 50 the bar or blank to be heated is passed between the pair of rolls 61 and 62 and between the rolls 65 and 66, and the current passes longitudinally of the blank or bar through that portion thereof which spans the space between the two pairs of rolls.

It is found that superior heating effects are obtained by the joint use of copper and carbon rolls, and also that there is less sparking than when both rolls are composed of copper.

We claim as our invention—

1. An electric-current converter having angular positive and negative rings for distributing the induced current and a number of electric heaters attached to the straight portions of said rings.

2. In an electric heater, the combination of the positive and negative converter-rings, brackets connected, respectively, to said rings, vertical standards supported by said brackets, and two pairs of contact-rolls supported on said standards.

3. In an electric heater, the combination of the positive and negative converter-rings, brackets connected, respectively, to said rings, vertical standards supported by said brackets and provided with slots, rolls supported on said standards, sliding blocks in said slots, rolls supported on said blocks, and springs for regulating the movements of said blocks.

4. In an electric heater, the combination of two pairs of contact-rolls, one roll of each pair being composed of copper and the other of carbon.

5. In an electric heater, the combination of two pairs of contact-rolls, one roll of each pair having a copper contact-face and the other a carbon contact-face.

6. In an electric heater, the combination of two pairs of contact-rolls, one roll of each pair having a carbon face and the other a copper face, each pair of rolls being connected with opposite electric poles.

In testimony that we claim the invention above set forth we affix our signatures in presence of two witnesses.

GEO. D. BURTON.
EDWIN E. ANGELL.

Witnesses:
CHESTER MARR,
EDW. T. TURNER.